United States Patent Office 2,975,018
Patented Mar. 14, 1961

2,975,018
TREATMENT OF FEATHERS WITH WERNER-TYPE CHROMIUM COMPLEXES

Adolf Schubert, Chicago, Ill., George Cohen, Lawrence, Mass., Robert M. Delcamp, Cincinnati, Ohio, and Robert M. Lollar, Clarendon Hills, Ill., assignors to the United States of America as represented by the Secretary of the Army No Drawing. Filed May 26, 1959, Ser. No. 816,354

27 Claims. (Cl. 8—94.1)

This invention relates to a method of treating feathers, especially land fowl feathers, to improve their filling power and water repellency. The treatment is durable to laundering and use, thereby making the treated feathers more suitable for use as a filler and insulating medium in sleeping bags, pillows, clothing, etc.

An object of this invention is to make land fowl feathers suitable for use in lieu of water fowl feathers as a filler and insulating material for pillows, sleeping bags, clothing, and for other uses wherein water fowl feathers have heretofore been considered to be superior.

It is also an object of this invention to improve the insulating and filling properties of land fowl feathers by imparting to them a curl which is largely retained on use and after laundering.

Another object is to improve the durability to use and laundering of land fowl feathers by imparting to them a high degree of water repellency.

A further object is to improve the resistance to decomposition of land fowl and water fowl feathers as evidenced by a lack of odor or heating when allowed to remain wet.

Still another object is to improve the insulating and filling properties of water fowl feathers, which improvement is largely retained after use and laundering.

The "filling power" of a feather filling material as it is used herein is defined as the height of a specific volume of a given weight of the material under a predetermined light load. A description of the method used to determine filling power of feather filling materials may be found in U.S. Government Military Specification MIL-F-5652C, Feathers and Down Water Fowl, dated May 29, 1953, and in a report entitled "A Proposed Method for Measuring the Filling Power of Down and Feathers," by Henry A. Sinski, Publication No. TD-103037, Office of Technical Services, Department of Commerce. The filling power determined by this method is expressed in centimeters. An apparatus for measuring the filling power of feathers is shown in Sinski et al. U.S. Patent No. 2,706,410.

Bulk or filling power and insulation value are proportional. High bulk or filling power is therefore an outstanding requirement of a filler for insulating purposes. Following are the range of filling powers, measured in centimeters, of various types of commercially available feather filling materials:

| Material | Filling Power (cms.) |
|---|---|
| Untreated Chicken Feathers | 1.5 to 2.5 |
| Untreated Water Fowl Feathers | 4.0 to 5.0 |
| Mixture of 40% Water Fowl Down and 60% Water Fowl Feathers | 5.5 to 6.5 |
| Water Fowl Down | 7.0 to 9.0 |

It is evident from these values that untreated chicken feathers lack the high bulk found in outstanding filling materials such as water fowl down. Water fowl feathers, while superior to chicken feathers in this respect, are inferior to water fowl down which is considered to be an outstanding filling material.

Water fowl and chicken feathers resemble each other in many respects. They differ however in that the quill or shaft of the water fowl feather is more or less curled. This curl is retained even after laundering in a confined area as in a pillow or sleeping bag. Chicken feathers are rarely curled in their natural state but can be curled by a number of relatively simple processes. Among these are treatments with a mild alkali, acid or even wetting in water, followed by drying in a relaxed state in a current of hot air. The curl obtained in this manner is not permanent however in that it is lost if the feathers are wet out and dried in a confined condition such as in a pillow or sleeping bag. The three dimensional shape of water fowl feathers, therefore, accounts for their improved filling power and insulating value when compared to chicken feathers.

Water fowl filling materials also possess a natural water repellency which is lacking in chicken feathers. This is an advantage in that it increases laundering durability and permits moisture vapor transfer without the filling material becoming degraded due to excessive moisture absorption. This water repellency is believed to be due to a natural oil coating which is lacking in chicken feathers.

Feathers are proteinaceous materials in that they are made up of feather keratin which in turn contains fibrous proteins of the general formula $NH_2CH.(R).COOH$, where R represents a number of different possible side chain groups. As such, feathers are susceptible to degradation in the presence of excess moisture with the resulting development of unpleasant odors and loss of insulating value as evidenced by a decrease in filling power.

In order to evaluate feathers treated by the process described in this disclosure, a simulated laundering test was used. It consists of determining the loss in filling power after laundering in a bag simulating a sleeping bag. The laundering procedure is the same as used in CCC-T-191b, Federal Specification Textile Test Methods, Method 5556, "Shrinkage in Laundering of Cloth, Mobile Laundry Method." The following are the results of tests carried out in this manner on representative untreated feather filling materials, which have been previously wet out and fluff-dried:

| Material | Filling Power (cms.) | |
|---|---|---|
| | Before | After |
| Chicken Feathers | 3.7 to 2.9 | 3.2 to 2.5 |
| Water Fowl Feathers | 5.6 to 4.2 | 4.7 to 3.6 |
| Mixture of 40% Water Fowl Down and 60% Water Fowl Feathers | 6.1 to 5.6 | 5.9 to 4.4 |

In accordance with this invention, it has been found that feathers treated with a chromium complex of the Werner type have an increased filling power much of which increase is retained after laundering and drying in a confined space such as a pillow or sleeping bag. In addition, feathers treated by this method do not develop an odor when allowed to remain in a moist condition. A Werner-type chromium complex is a compound of a trivalent chromium salt and a carboxylic acid formed in accordance with the valence theory of Professor Alfred Werner. According to the Werner theory, atoms may exert auxiliary valences as well as the principal valences occurring in simple compounds. These auxiliary valences may act to hold various groups to the atom exerting them, and the atom exerting the principal and auxiliary valences may become the nuclear atom of a complex compound or complex ion. A typical Werner-type chromium complex may be graphically represented by the formula

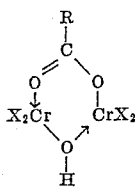

wherein the

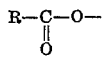

group is a functional acido group, derived from various organic acids having two or more carbon atoms in the molecule, such as glycolic acid, cyanoacetic acid, stearic acid, gluconic acid, myristic acid, palmitic acid, methacrylic acid, tannic acid, p-nitrobenzoic acid, p-aminobenzoic acid, etc. These acido groups are coordinated with a trivalent nuclear chromium atom in accordance with Werner's valence theory; in accordance with accepted terminology, they are designated by the name of the corresponding acids with the addition of the suffix "ato." While in the illustrated graphical formula, the ratio between chromium atoms and acido groups is 2:1, this ratio may vary within wide limits, e.g., from 1 to 10 chromium atoms per acido group; see Patent No. 2,273,040, Iler, and Patent No. 2,356,161, Iler.

The term "X" in the above graphical formula may be monovalent negative ionic groups such as fluoro, chloro, bromo, formato, acetato, or nitrato. In the Werner-type chrome complexes preferred for use in our invention, X is chloro, fluoro, or both. Surfaces which contain OH, $NH_2$, COOH, $CONH_2$ or $SO_3H$ groups are particularly susceptible to strong bond formation. The long chain hydrocarbon end of the complex is oriented away from the treated surface and, by virtue of its hydrophobic properties, produces the ability to withstand repeated laundering as well as water repellency and maintenance of high filling power in use.

Application of the chrome complex to the feathers as an aftertreatment, similar to the method used in the fat liquoring of leather, is not satisfactory as feathers treated in this manner do not have laundering resistance as evidenced by a marked decrease in filling power after laundering. In order to obtain satisfactory results, the chrome complex is applied in the manner described herein.

Feathers treated by the process described herein retain much of their water repellency and filling power due to the addition of the Werner-type complex to the carboxyl and amino groups in the feather structure and the subsequent formation of a net-like hydrophylic compound. The water repellency is presumably due to the outward orientation of the hydrophobic long chain hydrocarbon end of the complex. The chromium compounds of the Werner-type suitable for use in this process are compounds containing carboxylic acido groups and containing chromium in the molecule. The carboxylic acido groups may be acyclic, carbocyclic, saturated or unsaturated; they also may be fluorinated. Suitable carboxylic acido groups are, e.g., stearato, methacrylato, myristylato, glycolato, nitrobenzoato, tannato, gluconato, aminobenzoato and cyanoacetato. Complexes of this type are usually produced by processes in which contact is effected between carboxylic acido compounds and basic salts of trivalent chromium, as shown, e.g., in Patents Nos. 2,273,040 and 2,524,803, Iler.

Feathers to be treated according to the processes of this invention are first washed by any procedure which will leave them clean and comparatively free of blood. Such procedures are conventionally used in industry for washing feathers. The following procedure, which is used commercially, has been found to be satisfactory for wet plucked feathers. Any other washing procedure which accomplishes the same result will be satisfactory.

(a) Place the feathers in the washer. Fill washer with cold water to the half-way level. Open the bottom drain and allow the water to run out. Add water at room temperature continuously at a rate sufficient to maintain the level. Continue for 15 minutes after which the flow of water is cut off and the washer is drained.

(b) Fill the washer to the half-way level with water at 85° F. Add about one ounce of blood solubilizer, such as trisodium phosphate, to every 10 gallons of the bath. Hold 15 minutes and drain.

(c) Fill to half-way level with water at 85° F. Add sufficient non-ionic detergent, about 1 ounce per 10 gallons, to give slight suds. Hold 15 minutes and drain.

(d) The principal feather treatment in accordance with the present invention may commence at this point. However, if it is desired to put the feathers in storage without immediate further treatment, the following run should be added:

Fill the washer to the half-way level with cold water. Add sufficient sodium acid fluoride to bring the pH below 5. Hold 45 minutes, drain, centrifuge, and dry.

The following examples will further illustrate the process of the invention but the invention is not restricted to these examples. All parts are by weight. The feathers may be wet as they come from the washing process, or dry. The weight of the feathers is based on dry weight. The feathers are usually fractionated to remove wing, tail and other vane feathers. If desired, the fractionation may be carried out after treatment. The method is the same for land fowl or water fowl feathers.

*Example I*

6.2 pounds of dry land fowl feathers are immersed in 35 gallons of water at 100° F. containing 1.2 pounds of NaCl (common salt). The pH of the bath is adjusted to 2.5 with dilute sulfuric acid. The feathers are held in the bath with occasional agitation, until the bath has reached equilibrium as determined by titrating aliquots of the bath.

At this point, 62.5% of the bath is discarded. To the remainder of the bath are added 15 ounces of a Werner-type myristylato chromic chloride solution containing approximately 5.5% chromium. A commercially available compound of this type is "Quilon M," manufactured by E. I. du Pont de Nemours & Company. The feathers are held in this bath for about 3 hours at 100° F. with occasional agitation. The pH of the bath is then adjusted to 3.9 by slowly adding a sodium bicarbonate solution over a period of about two hours. The bath temperature is then raised to about 140° F., and the feathers are permitted to remain in the bath for an additional 1 to 3 hours. Then the feathers are removed from the bath, rinsed and dried. The initial filling power of the treated feathers was found to be 5.8–6.1 cm., and after laundering 4.5–5.1 cm.

*Example II*

Example I was repeated with the use of a Werner-type chromium complex containing approximately 4.6% chromium wherein the coordinated carboxylic acido group had the general formula

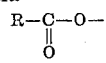

R being a per-fluorinated monovalent radical having 7 carbon atoms; a commercially available compound of this type is "Fluorochemical FC–146" manufactured by the Minnesota Mining & Mfg. Co. The initial filling power of the treated feathers was found to be 5.3–7.1 cm., and after laundering 3.9–4.7 cm.

*Examples III to X*

Example I was repeated with a number of Werner-type chromium complexes wherein a carboxylic acido group other than myristylato was present in lieu of the myristylato group of Example I.

| Carboxylic Acido Group | Filling Power (cm.) | |
| --- | --- | --- |
| | Initially | After Laundering |
| Ex. III........ Stearato................... | 5.8 | 5.0 |
| Ex. IV........ Methacrylato............... | 5.6 | 3.9 |
| Ex. V......... Glycolato.................. | 6.1 | 3.2 |
| Ex. VI........ p-Nitrobenzoato............ | 6.0 | 3.6 |
| Ex. VII....... Tannato................... | 5.5 | 3.8 |
| Ex. VIII...... Gluconato................. | 5.9 | 3.1 |
| Ex. IX........ p-Aminobenzoato........... | 6.0 | 3.7 |
| Ex. X......... Cyanoacetato.............. | 6.0 | 3.3 |
| Control: Untreated Chicken Feathers. | 3.3 (av.) | 2.85 (av.) |

The solvent for the Werner-type complex in the foregoing examples was isopropyl alcohol. However, other alcohols such as ethanol, or water are suitable solvents. The amount of the chrome complex added was 15% of the weight of the chicken feathers; but this amount may be widely varied as will be more fully explained hereafter.

The pH of the initial bath may vary between about 1.2 and about 3.5; the optimum pH being about 2.5 when a myristylator chromium complex of the Werner-type is subsequently employed. After addition of the chromium complex, we recommend adjustment of the pH of the bath to about 3–6, an optimum range being about 3.2–4.5, depending on the identity of the carboxylic acido group of the Werner complex.

The concentration of the Werner-type chromium complex in proportion to the weight of the treated feathers may vary within a very wide range, say, from about 2.5% to about 200% of chromium complex, based on the weight of the feathers, without substantially changing the final result in terms of filling power of treated feathers. This is shown by the following runs:

| Carboxylic Acido Group of Chromium Complex | Percent | Filling Power (cm.) | |
| --- | --- | --- | --- |
| | | Initially | After Laundering |
| Myristylato....................... | 2.5 | 5.3 | 4.8 |
| Do.............................. | 12.5 | 6.0 | 5.3 |
| Do.............................. | 40 | 5.5 | 4.2 |
| Stearato......................... | 15 | 5.3–5.8 | 4.7–5 |
| Do.............................. | 40 | 5.5 | 4.4 |
| Do.............................. | 200 | 5.4 | 4.4 |

We recommend the addition of some common salt (sodium chloride) to the initial bath, although this step is not indispensable. The following table shows the effect of varying the amount of salt added to the initial bath liquor under the general conditions of Example I (myristylato chromium complex added subsequently):

| Percent of Salt | Filling Power (cm.) | |
| --- | --- | --- |
| | Initially | After Laundering |
| None............................ | 4.9 | 3.5 |
| 0.1.............................. | 5.8 | 4.4 |
| 0.3 (optimum).................. | 6.3 | 4.7 |
| 4.0.............................. | 5.3 | 4.3 |

Temperature conditions of the bath may vary between room temperature (say about 70° F.) and an elevated temperature that is non-injurious to the feathers (e.g., about 200° F.). These temperatures may vary depending on the nature of the Werner-type chromium complex used, particularly with respect to the identity of the carboxylic acido group thereof. For optimum results, we recommend an initial bath temperature between about 70° F. and 140° F., and an adjustment of the pH of the bath to between about 3 and about 6 and of the bath temperature after addition of the Werner-type complex to between about 80° and 200° F.; 140–175° F. being considered the optimum when a myristylato chromium complex is employed.

While the principal use of our invention is the treatment of land fowl feathers to increase their filling power to the order of magnitude of the filling power of water fowl feathers, we have also found that non-downy water fowl feathers may be treated in accordance with our invention so as to increase their filling power to the equivalent of the filling power of a more expensive mixture of water fowl down and untreated non-downy water fowl feathers, e.g., the 40% down and 60% non-downy water fowl feather mixture ("40/60 mixture") standardized by the Department of the Army. Thus, water fowl down has a filling power of about 7 to 9 cm., a 40/60 water fowl down and feather mixture has an initial filling power of about 5.6–6.1 cm. and a filling power of from about 4.4 to about 5.9 cm. after laundering, and representative water fowl feathers have an initial filling power of about 4.2–5.6 cm. and of about 3.6–4.7 cm. after laundering. The following examples show the result of the treatment of water fowl feathers in accordance with our invention:

*Example XI*

Example I was repeated by substituting water fowl feathers for the chicken feathers of Example I. An initial filling power of 6.5 cm., and a filling power of 5.6 cm. after laundering was noted, which is about equal to the filling power of a 40/60 water fowl down and feather mixture.

*Example XII*

Example I was repeated by substituting water fowl feathers for the chicken feathers of Example I. An initial filling power of 7 cm., and a filling power of 5.3 cm. after laundering was noted, which is at least about equivalent to the filling power of a 40/60 water fowl down and feather mixture.

We have further found that the filling power and other desirable characteristics, such as stability, of the feathers treated in accordance with our invention are still further improved by adding to the bath a water soluble chromium compound such as a basic chromium sulfate, e.g., in the form of commercially available compounds such as Tanolin R, which is one-third basic chromic sulfate containing about 25% chromic oxide. The chromium compound may be added either at the same time as, or preceding the addition of the Werner-type organic chromium complex to the bath. A preliminary pre-curling treatment of the feathers with trisodium phosphate may be employed, if desired. Reference is made in this connection to copending application Serial No. 654,615, Varsenig Z. Pasternak and Robert M. Lollar, "Chromic Acid Treatment of Feathers," filed April 23, 1957, which is assigned to the same assignee as the instant patent application, namely the Government of the United States as represented by the Secretary of the Army; this application discloses a feather treatment with inorganic chromium compounds and an optional pre-treatment with trisodium phosphate or other suitable buffered alkaline solutions, such as sodium carbonate or borax, which latter two compounds are also suitable for the optional precurling treatment of feathers in accordance with our invention.

The following examples illustrate recommended procedures of carrying this aspect of our invention into practice.

*Example XIII*

70 g. of chicken feathers having a filling power of 3.2 cm. are treated with 3 liters of about 1% $Na_3PO_4.12H_2O$ solution at about 100–105° F. for about 13 minutes. Drain 7 minutes, rinse 20 minutes. Then the feathers are covered with 3 liters of a 1% Tanolin R solution, the pH is adjusted to about 3.5, and the bath is held at about 100–105° F. for about 3 hours. Drain and rinse for 15 minutes. Then the feathers are covered with 3 liters of a 1% Quilon M (Werner-type myristylato chromium complex) solution. The pH is adjusted to about 3.0 and the bath is held at 100–105° F. for about 3 hours. The feathers are then removed from the bath, rinsed and tumble-dried. The initial filling power of the treated feathers was found to be 5.9 cm., and after application of the above-described accelerated laundering test 4.8 cm.

*Example XIV*

6.2 pounds of chicken feathers are wetted out at about 100° F. .4% common salt, based on the weight of the solution is added, and the pH of the bath is adjusted with dilute sulfuric acid to 2.5. The feathers are held in the bath overnight. Next, 10% Tanolin R and 9.5% Quilon M (both by weight, based on the weight of the feathers) are added in increments with stirring over a period of 3 hours, and the feathers are held in the solution for an additional 6 hours. The pH of the bath is then raised to 3.9 by adding sodium bicarbonate in increments for 1 hour with continuous stirring. The stirrer is kept going for 1 hour, following which the feathers are kept in the bath for overnight without stirring. Finally, the bath is warmed to 140° F. and the feathers are kept therein for 1 hour. The feathers are then removed from the bath, rinsed and dried.

*Example XV*

A solution of Quilon M (Werner-type myristylato chromium complex) and Tanolin R (one-third basic chromic sulfate containing about 25% chromic oxide) is prepared by adding 20 pounds of Tanolin R to approximately 30 gallons of water and heating to a boil. 10 pounds of Quilon M are slowly added through a tube below the surface of the boiling solution, and the boiling is continued for approximately 5 minutes after the Quilon M has been added.

200 pounds of chicken feathers are wetted out in approximately 500 gallons of water, warmed to 100° F., and 20 pounds of salt and sufficient sulfuric acid are added to bring the pH of the bath to 3.1. The Quilon M and Tanolin R containing solution, prepared as shown above, is added to the bath, and the feathers are held therein with intermittent agitation for about 6 hours. The bath is then drained, and the feathers are rinsed and fluff-dried.

*Example XVI*

A solution of Tanolin R and Quilon M is prepared as in Example XV. 200 pounds of chicken feathers are wetted out in approximately 500 gallons of water, warmed to 100° F., and 20 pounds of salt and sufficient sulfuric acid are added to bring the pH of the bath to about 2.5. The feathers are held in the bath overnight. The Tanolin R and Quilon M solution is then added to the bath, the feathers are agitated in the bath for about 6 to 7 hours. The pH of the bath is then raised to about 3.9 with sodium bicarbonate, the feathers are agitated for about 1 hour and held in the bath overnight. The bath is then drained, and the feathers are rinsed and fluff-dried.

*Example XVII*

200 pounds of chicken feathers are wetted out in approximately 500 gallons of water, heated to 100° F. and sufficient sulfuric acid is added to bring the pH of the bath to 3.5. A water solution containing 20 pounds of Tanolin R is added, and the feathers are held in the bath for about 3 hours with intermittent agitation, followed by draining of the bath and rinsing of the feathers. The feathers are then placed in approximately 500 gallons of water, and 20 pounds of salt and sufficient sulfuric acid are added to bring the pH of the bath to about 3.1. The bath is warmed to about 100° F. A solution of 10 pounds of Quilon M in 30 gallons of water is prepared by adding the Quilon M slowly below the surface of boiling water and continuing the boil for about 5 minutes after all the Quilon M has been added. This solution is permitted to cool to between room temperature and about 100° F., and is added to the bath. The feathers are held in the bath for about 3 additional hours with intermittent agitation, and the bath is finally drained, and the feathers rinsed and fluff-dried.

Feather mixtures containing 37½% chicken feathers treated in accordance with Examples XIV to XVII, and 62½% of a mixture of 40 parts water fowl down and 60 parts water fowl feathers, were found to have a filling power of the same order of a mixture of 40 parts water fowl down and 60 parts water fowl feathers (about 5.5–6.5 cm.).

We have thus shown that the methods described in the foregoing disclosure of our invention can be used to increase the filling power and stability of chicken feathers so that they can be used in place of water fowl feathers for insulation purposes. Chicken feathers in their original form are considered to be a very poor substitute for water fowl feathers. In some respects, such as launderability and resistance to decomposition, chicken feathers treated in the manner described, are superior to water fowl feathers. The methods described herein can also be used to increase the filling power and resistance to decomposition of water fowl feathers.

Having thus described our invention and several modes by which the same may be carrier into practice, it will be clear that several modifications and changes thereof may be made without departing from the spirit of our invention or from the scope of the subjoined claims. We thus desire to claim our invention as broadly as the prior art and the essential features of our invention will permit, and to this end have appended the following claims.

We claim:

1. A method of treating feathers to enhance their filling power, comprising placing said feathers in an acidic bath having a pH from about 1.2 to about 3.5 until equilibrium is substantially reached, then adding to said bath a solution of a Werner-type complex in which a trivalent nuclear chromium atom is coordinated with a carboxylic acido group having at least two carbon atoms, adjusting the pH of said bath to between about 3 and about 6, and keeping said fathers in said bath until their filling power is substantially increased; removing the feathers from said bath, and rinsing and drying them.

2. Method according to claim 1, wherein the pH of the bath containing the Werner-type chromium complex is adjusted to between about 3.2 and about 4.5.

3. The method according to claim 1, conducted at a bath temperature between about 70° F. and about 200° F.

4. Method according to claim 1, wherein said carboxylic acido group is myristylato.

5. Method according to claim 1, wherein said carboxylic acido group is stearato.

6. Method according to claim 1, wherein said carboxylic acido group is methacrylato.

7. Method according to claim 1, wherein said carboxylic acido group is tannato.

8. Method according to claim 1, wherein said carboxylic acido group is a member of the group consisting of nitrobenzoato and aminobenzoato.

9. Method according to claim 1, wherein said bath also contains from about .1 to about 4 percent of sodium chloride, based on the liquor in the initial bath.

10. Method according to claim 1, wherein said bath also contains a water-soluble chromium compound in solution.

11. Method according to claim 10, wherein said carboxylic acido group is myristylato.

12. Method according to claim 10, wherein said inorganic chromium compound is a chromium sulfate.

13. A method of treating land fowl feathers to enhance their filling power, comprising placing said feathers in an acidic bath having a pH from about 1.2 to about 3.5 until equilibrium is substantially reached, then adding to said bath a solution of a Werner-type complex in which a trivalent nuclear chromium atom is coordinated with a carboxylic acido group having at least two carbon atoms, adjusting the pH of said bath to between about 3 and about 6, and keeping said fathers in said bath until their filling power is substantially increased; removing the feathers from said bath, and rinsing and drying them.

14. A method of treating water fowl feathers to enhance their filling power, comprising placing said feathers in an acidic bath having a pH from about 1.2 to about 3.5 until equilibrium is substantially reached, then adding to said bath a solution of a Werner-type complex in which a trivalent nuclear chromium atom is coordinated with a carboxylic acido group having at least two carbon atoms, adjusting the pH of said bath to between about 3 and about 6, and keeping said feathers in said bath until their filling power is substantially increased; removing the feathers from said bath, and rinsing and drying them.

15. A method of treating land fowl feathers to enhance their filling power, comprising placing said feathers in an acidic bath having a temperature of about 70° F. to about 140° F. and a pH from about 1.2 to about 3.5 until equilibrium is substantially reached, then adding to said bath a solution of a Werner-type complex in which a trivalent nuclear chromium atom is coordinated with a carboxylic acido group having at least two carbon atoms, adjusting the temperature of said bath to from about 80° F. to about 200° F. and the pH of said bath to from about 3 to about 6, and keeping said feathers in said bath until their filling power is substantially increased; removing the feathers from said bath, and rinsing and drying them.

16. Method according to claim 15, wherein the initial pH of said bath is about 2.5.

17. Method according to claim 15, wherein said carboxylic acido group is myristylato.

18. Method according to claim 15, wherein said bath also contains from about .1 to about 4 percent of sodium chloride, based on the liquor in the initial bath.

19. Method according to claim 15, wherein said bath also contains a water-soluble chromium compound in solution.

20. Method according to claim 15, wherein said bath also contains a chromium sulfate in solution.

21. Method according to claim 15, wherein said carboxylic acido group is myristylato and wherein said bath also contains a chromium sulfate in solution.

22. Method according to claim 15, wherein the pH of the bath containing the Werner-type chromium complex is adjusted to between about 3.2 and about 4.5.

23. Land fowl feathers having an increased filling power substantially equivalent to that of a water fowl feather, said land fowl feathers being produced by the method of claim 1.

24. Non-downy water fowl feathers produced by the method of claim 1, said feathers having an increased filling power substantially equivalent to that of a mixture of about 40 parts of water fowl down and about 60 parts of untreated non-downy water fowl feathers.

25. Feathers having increased filling power, said feathers being produced by the method of claim 10.

26. Feathers having increased filling power, said feathers being produced by the method of claim 19.

27. Feathers having increased filling power, said feathers being produced by the method of claim 21.

References Cited in the file of this patent

UNITED STATES PATENTS

| | | |
|---|---|---|
| 2,356,161 | Iller | Aug. 22, 1944 |
| 2,805,116 | Florio | Sept. 3, 1957 |
| 2,805,914 | Frederick et al. | Sept. 10, 1957 |
| 2,886,399 | Pasternak et al. | May 12, 1959 |